(12) United States Patent
Borland et al.

(10) Patent No.: US 9,965,442 B2
(45) Date of Patent: *May 8, 2018

(54) NODE CARD MANAGEMENT IN A MODULAR AND LARGE SCALABLE SERVER SYSTEM

(71) Applicant: III HOLDINGS 2, LLC, Wilmington, DE (US)

(72) Inventors: David Borland, Austin, TX (US); Arnold Thomas Schnell, Pflugerville, TX (US); Mark Davis, Austin, TX (US)

(73) Assignee: III HOLDINGS 2, LLC, Wilmington, DE (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/809,723

(22) Filed: Jul. 27, 2015

(65) Prior Publication Data

US 2016/0026606 A1 Jan. 28, 2016

Related U.S. Application Data

(63) Continuation of application No. 13/527,505, filed on Jun. 19, 2012, now Pat. No. 9,092,594.

(60) Provisional application No. 61/553,555, filed on Oct. 31, 2011.

(51) Int. Cl.
*G06F 15/78* (2006.01)
*G06F 13/40* (2006.01)
*G06F 13/42* (2006.01)

(52) U.S. Cl.
CPC ...... *G06F 15/7803* (2013.01); *G06F 13/4068* (2013.01); *G06F 13/4282* (2013.01); *Y02D 10/12* (2018.01); *Y02D 10/13* (2018.01); *Y02D 10/14* (2018.01); *Y02D 10/151* (2018.01)

(58) Field of Classification Search
CPC ............ G06F 13/40; G06F 2213/0012; G06F 2213/0026
USPC ......................................................... 713/300
See application file for complete search history.

(56) References Cited

U.S. PATENT DOCUMENTS

| | | |
|---|---|---|
| 5,451,936 A | 9/1995 | Yang et al. |
| 5,594,908 A | 1/1997 | Hyatt |
| 5,623,641 A | 4/1997 | Kadoyashiki |
| 5,781,187 A | 7/1998 | Gephardt et al. |
| 5,901,048 A | 5/1999 | Hu |
| 5,908,468 A | 6/1999 | Hartmann |
| 5,968,176 A | 10/1999 | Nessett et al. |
| 5,971,804 A | 10/1999 | Gallagher et al. |
| 6,055,618 A | 4/2000 | Thorson |

(Continued)

FOREIGN PATENT DOCUMENTS

| | | |
|---|---|---|
| JP | 2005-223753 | 8/2005 |
| JP | 2005-536960 | 12/2005 |

(Continued)

OTHER PUBLICATIONS

Advanced Switching Technology Tech Brief, published 2005, 2 pages.

(Continued)

*Primary Examiner* — Dennis M Butler
*Assistant Examiner* — Santosh R Poudel

(57) ABSTRACT

A system for a system and method for provisioning of modular compute resources within a system design are provided.

15 Claims, 10 Drawing Sheets

(56) References Cited

U.S. PATENT DOCUMENTS

| | | | |
|---|---|---|---|
| 6,141,214 A | 10/2000 | Ahn | |
| 6,181,699 B1 | 1/2001 | Crinion et al. | |
| 6,192,414 B1 | 2/2001 | Horn | |
| 6,198,741 B1 | 3/2001 | Yoshizawa et al. | |
| 6,252,878 B1 | 6/2001 | Locklear | |
| 6,314,487 B1 | 11/2001 | Hahn et al. | |
| 6,314,501 B1 | 11/2001 | Gulick et al. | |
| 6,373,841 B1 | 4/2002 | Goh et al. | |
| 6,442,137 B1 | 8/2002 | Yu et al. | |
| 6,446,192 B1 | 9/2002 | Narasimhan et al. | |
| 6,452,809 B1 | 9/2002 | Jackson et al. | |
| 6,507,586 B1 | 1/2003 | Satran et al. | |
| 6,556,952 B1 | 4/2003 | Magro | |
| 6,574,238 B1 | 6/2003 | Thrysoe | |
| 6,661,671 B1* | 12/2003 | Franke | G06F 1/189 |
| | | | 361/679.02 |
| 6,711,691 B1 | 3/2004 | Howard et al. | |
| 6,766,389 B2 | 7/2004 | Hayter et al. | |
| 6,813,676 B1 | 11/2004 | Henry et al. | |
| 6,816,750 B1 | 11/2004 | Klaas | |
| 6,842,430 B1 | 1/2005 | Melnik | |
| 6,857,026 B1 | 2/2005 | Cain | |
| 6,963,926 B1 | 11/2005 | Robinson | |
| 6,963,948 B1 | 11/2005 | Gulick | |
| 6,977,939 B2 | 12/2005 | Joy et al. | |
| 6,988,170 B2 | 1/2006 | Barroso et al. | |
| 6,990,063 B1 | 1/2006 | Lenoski et al. | |
| 7,020,695 B1 | 3/2006 | Kundu et al. | |
| 7,032,119 B2 | 4/2006 | Fung | |
| 7,080,078 B1 | 7/2006 | Slaughter et al. | |
| 7,080,283 B1 | 7/2006 | Songer et al. | |
| 7,095,738 B1 | 8/2006 | Desanti | |
| 7,119,591 B1 | 10/2006 | Lin | |
| 7,143,153 B1 | 11/2006 | Black et al. | |
| 7,165,120 B1 | 1/2007 | Giles et al. | |
| 7,170,315 B2 | 1/2007 | Bakker et al. | |
| 7,180,866 B1 | 2/2007 | Chartre et al. | |
| 7,203,063 B2 | 4/2007 | Bash et al. | |
| 7,257,655 B1 | 8/2007 | Burney et al. | |
| 7,263,288 B1 | 8/2007 | Islam | |
| 7,274,705 B2 | 9/2007 | Chang et al. | |
| 7,278,582 B1 | 10/2007 | Siegel et al. | |
| 7,310,319 B2 | 12/2007 | Awsienko et al. | |
| 7,325,050 B2 | 1/2008 | O'Connor et al. | |
| 7,337,333 B2 | 2/2008 | O'Conner et al. | |
| 7,340,777 B1 | 3/2008 | Szor | |
| 7,353,362 B2 | 4/2008 | Georgiou et al. | |
| 7,382,154 B2 | 6/2008 | Ramos et al. | |
| 7,386,888 B2 | 6/2008 | Liang et al. | |
| 7,418,534 B2 | 8/2008 | Hayter et al. | |
| 7,437,540 B2 | 10/2008 | Paolucci et al. | |
| 7,447,147 B2 | 11/2008 | Nguyen et al. | |
| 7,447,197 B2 | 11/2008 | Terrell et al. | |
| 7,466,712 B2 | 12/2008 | Makishima et al. | |
| 7,467,306 B2 | 12/2008 | Cartes et al. | |
| 7,467,358 B2 | 12/2008 | Kang et al. | |
| 7,502,884 B1 | 3/2009 | Shah et al. | |
| 7,519,843 B1 | 4/2009 | Buterbaugh et al. | |
| 7,555,666 B2 | 6/2009 | Brundridge et al. | |
| 7,583,661 B2 | 9/2009 | Chaudhuri | |
| 7,586,841 B2 | 9/2009 | Vasseur | |
| 7,596,144 B2 | 9/2009 | Pong | |
| 7,599,360 B2 | 10/2009 | Edsall et al. | |
| 7,606,225 B2 | 10/2009 | Xie et al. | |
| 7,606,245 B2 | 10/2009 | Ma et al. | |
| 7,616,646 B1 | 11/2009 | Ma et al. | |
| 7,620,057 B1 | 11/2009 | Aloni et al. | |
| 7,644,215 B2 | 1/2010 | Wallace et al. | |
| 7,657,677 B2 | 2/2010 | Huang et al. | |
| 7,657,756 B2 | 2/2010 | Hall | |
| 7,660,922 B2 | 2/2010 | Harriman | |
| 7,664,110 B1 | 2/2010 | Lovett et al. | |
| 7,673,164 B1 | 3/2010 | Agarwal | |
| 7,710,936 B2 | 5/2010 | Morales Barroso | |
| 7,719,834 B2 | 5/2010 | Miyamoto et al. | |
| 7,721,125 B2 | 5/2010 | Fung | |
| 7,751,433 B2 | 7/2010 | Dollo et al. | |
| 7,760,720 B2 | 7/2010 | Pullela et al. | |
| 7,761,687 B2 | 7/2010 | Blumrich et al. | |
| 7,783,910 B2 | 8/2010 | Felter et al. | |
| 7,791,894 B2 | 9/2010 | Bechtolsheim | |
| 7,792,113 B1 | 9/2010 | Foschiano et al. | |
| 7,796,399 B2 | 9/2010 | Clayton et al. | |
| 7,801,132 B2 | 9/2010 | Ofek et al. | |
| 7,802,017 B2 | 9/2010 | Uemura et al. | |
| 7,805,575 B1 | 9/2010 | Agarwal et al. | |
| 7,831,839 B2 | 11/2010 | Hatakeyama | |
| 7,840,703 B2 | 11/2010 | Arimilli et al. | |
| 7,865,614 B2 | 1/2011 | Lu et al. | |
| 7,925,795 B2 | 4/2011 | Tamir et al. | |
| 7,934,005 B2 | 4/2011 | Fascenda | |
| 7,970,929 B1 | 6/2011 | Mahalingaiah | |
| 7,975,110 B1 | 7/2011 | Spaur et al. | |
| 7,991,817 B2 | 8/2011 | Dehon et al. | |
| 7,991,922 B2 | 8/2011 | Hayter et al. | |
| 7,992,151 B2 | 8/2011 | Warrier et al. | |
| 8,019,832 B2 | 9/2011 | De Sousa et al. | |
| 8,060,760 B2 | 11/2011 | Shetty et al. | |
| 8,060,775 B1 | 11/2011 | Sharma et al. | |
| 8,082,400 B1 | 12/2011 | Chang et al. | |
| 8,108,508 B1 | 1/2012 | Goh et al. | |
| 8,122,269 B2 | 2/2012 | Houlihan et al. | |
| 8,132,034 B2 | 3/2012 | Lambert et al. | |
| 8,155,113 B1 | 4/2012 | Agarwal | |
| 8,156,362 B2 | 4/2012 | Branover et al. | |
| 8,165,120 B2 | 4/2012 | Maruccia et al. | |
| 8,170,040 B2 | 5/2012 | Konda | |
| 8,180,996 B2 | 5/2012 | Fullerton et al. | |
| 8,189,612 B2 | 5/2012 | Lemaire et al. | |
| 8,194,659 B2 | 6/2012 | Ban | |
| 8,199,636 B1 | 6/2012 | Rouyer et al. | |
| 8,205,103 B2 | 6/2012 | Kazama et al. | |
| 8,379,425 B2 | 2/2013 | Fukuoka et al. | |
| 8,397,092 B2 | 3/2013 | Karnowski | |
| 8,407,428 B2 | 3/2013 | Cheriton et al. | |
| 8,504,791 B2 | 8/2013 | Cheriton et al. | |
| RE44,610 E | 11/2013 | Krakirian et al. | |
| 8,599,863 B2 | 12/2013 | Davis | |
| 8,684,802 B1 | 4/2014 | Gross et al. | |
| 8,738,860 B1 | 5/2014 | Griffin et al. | |
| 8,745,275 B2 | 6/2014 | Ikeya et al. | |
| 8,745,302 B2 | 6/2014 | Davis et al. | |
| 8,782,321 B2 | 7/2014 | Harriman et al. | |
| 8,812,400 B2 | 8/2014 | Faraboschi et al. | |
| 8,824,485 B2 | 9/2014 | Biswas et al. | |
| 8,854,831 B2 | 10/2014 | Arnouse | |
| 8,903,964 B2 | 12/2014 | Breslin | |
| 9,008,079 B2 | 4/2015 | Davis et al. | |
| 9,075,655 B2 | 7/2015 | Davis et al. | |
| 9,311,269 B2 | 4/2016 | Davis et al. | |
| 9,465,771 B2 | 10/2016 | Davis et al. | |
| 2001/0046227 A1 | 11/2001 | Matsuhira et al. | |
| 2002/0004912 A1 | 1/2002 | Fung | |
| 2002/0040391 A1 | 4/2002 | Chaiken et al. | |
| 2002/0083352 A1 | 6/2002 | Fujimoto et al. | |
| 2002/0097732 A1 | 7/2002 | Worster et al. | |
| 2002/0107903 A1 | 8/2002 | Richter et al. | |
| 2002/0124128 A1 | 9/2002 | Qiu | |
| 2002/0159452 A1 | 10/2002 | Foster et al. | |
| 2002/0161917 A1 | 10/2002 | Shapiro et al. | |
| 2002/0172205 A1 | 11/2002 | Tagore-Brage et al. | |
| 2002/0186656 A1 | 12/2002 | Vu | |
| 2002/0194412 A1 | 12/2002 | Bottom | |
| 2002/0196611 A1* | 12/2002 | Ho | G06F 13/4081 |
| | | | 361/752 |
| 2003/0007493 A1 | 1/2003 | Oi et al. | |
| 2003/0033547 A1 | 2/2003 | Larson et al. | |
| 2003/0041266 A1 | 2/2003 | Ke et al. | |
| 2003/0076832 A1 | 4/2003 | Ni | |
| 2003/0093255 A1 | 5/2003 | Freyensee et al. | |
| 2003/0093624 A1 | 5/2003 | Arimilli et al. | |
| 2003/0110262 A1 | 6/2003 | Hasan et al. | |
| 2003/0140190 A1 | 7/2003 | Mahony et al. | |
| 2003/0158940 A1 | 8/2003 | Leigh | |

(56) References Cited

U.S. PATENT DOCUMENTS

| | | |
|---|---|---|
| 2003/0159083 A1 | 8/2003 | Fukuhara et al. |
| 2003/0172191 A1 | 9/2003 | Williams |
| 2003/0188083 A1 | 10/2003 | Kumar et al. |
| 2003/0193402 A1 | 10/2003 | Post et al. |
| 2003/0202520 A1 | 10/2003 | Witkowski et al. |
| 2003/0231624 A1 | 12/2003 | Alappat et al. |
| 2004/0013113 A1 | 1/2004 | Singh et al. |
| 2004/0017806 A1 | 1/2004 | Yazdy et al. |
| 2004/0017808 A1 | 1/2004 | Forbes et al. |
| 2004/0030938 A1 | 2/2004 | Barr et al. |
| 2004/0068676 A1 | 4/2004 | Larson et al. |
| 2004/0111612 A1 | 6/2004 | Choi et al. |
| 2004/0141521 A1 | 7/2004 | George |
| 2004/0165588 A1 | 8/2004 | Pandya |
| 2004/0210693 A1 | 10/2004 | Zeitler et al. |
| 2004/0215864 A1 | 10/2004 | Arimilli et al. |
| 2004/0215991 A1 | 10/2004 | McAfee et al. |
| 2004/0267486 A1 | 12/2004 | Percer et al. |
| 2005/0015378 A1 | 1/2005 | Gammel et al. |
| 2005/0018604 A1 | 1/2005 | Dropps et al. |
| 2005/0018606 A1 | 1/2005 | Dropps et al. |
| 2005/0018663 A1 | 1/2005 | Dropps et al. |
| 2005/0021606 A1 | 1/2005 | Davies et al. |
| 2005/0021728 A1 | 1/2005 | Sugimoto |
| 2005/0030954 A1 | 2/2005 | Dropps et al. |
| 2005/0033742 A1 | 2/2005 | Kamvar et al. |
| 2005/0033890 A1 | 2/2005 | Lee |
| 2005/0044195 A1 | 2/2005 | Westfall |
| 2005/0077921 A1 | 4/2005 | Percer et al. |
| 2005/0105538 A1 | 5/2005 | Perera et al. |
| 2005/0141424 A1 | 6/2005 | Lim et al. |
| 2005/0228852 A1 | 10/2005 | Santos et al. |
| 2005/0240688 A1 | 10/2005 | Moerman et al. |
| 2005/0259397 A1 | 11/2005 | Bash et al. |
| 2006/0002311 A1 | 1/2006 | Iwanaga et al. |
| 2006/0013218 A1 | 1/2006 | Shore et al. |
| 2006/0023245 A1* | 2/2006 | Sato .................... G06F 3/1213 358/1.13 |
| 2006/0029053 A1 | 2/2006 | Roberts et al. |
| 2006/0090025 A1 | 4/2006 | Tufford et al. |
| 2006/0136570 A1 | 6/2006 | Pandya |
| 2006/0140211 A1 | 6/2006 | Huang et al. |
| 2006/0174342 A1 | 8/2006 | Zaheer et al. |
| 2006/0179241 A1 | 8/2006 | Clark et al. |
| 2006/0236371 A1 | 10/2006 | Fish |
| 2006/0248359 A1 | 11/2006 | Fung |
| 2006/0259734 A1 | 11/2006 | Sheu et al. |
| 2006/0265609 A1 | 11/2006 | Fung |
| 2007/0006001 A1 | 1/2007 | Isobe et al. |
| 2007/0047195 A1* | 3/2007 | Merkin .................. G06F 1/206 361/679.31 |
| 2007/0076653 A1 | 4/2007 | Park et al. |
| 2007/0081315 A1 | 4/2007 | Mondor et al. |
| 2007/0094486 A1 | 4/2007 | Moore et al. |
| 2007/0109968 A1 | 5/2007 | Hussain et al. |
| 2007/0130397 A1 | 6/2007 | Tsu |
| 2007/0174390 A1 | 7/2007 | Silvain et al. |
| 2007/0180310 A1 | 8/2007 | Johnson et al. |
| 2007/0209072 A1 | 9/2007 | Chen |
| 2007/0226795 A1 | 9/2007 | Conti et al. |
| 2007/0280230 A1 | 12/2007 | Park |
| 2007/0286009 A1 | 12/2007 | Norman |
| 2007/0288585 A1 | 12/2007 | Sekiguchi et al. |
| 2008/0013453 A1 | 1/2008 | Chiang et al. |
| 2008/0040463 A1 | 2/2008 | Brown et al. |
| 2008/0052437 A1 | 2/2008 | Loffink et al. |
| 2008/0059782 A1 | 3/2008 | Kruse et al. |
| 2008/0075089 A1 | 3/2008 | Evans et al. |
| 2008/0089358 A1 | 4/2008 | Basso et al. |
| 2008/0104264 A1 | 5/2008 | Duerk et al. |
| 2008/0140771 A1 | 6/2008 | Vass et al. |
| 2008/0140930 A1 | 6/2008 | Hotchkiss |
| 2008/0159745 A1 | 7/2008 | Segal |
| 2008/0162691 A1 | 7/2008 | Zhang et al. |
| 2008/0183882 A1 | 7/2008 | Flynn et al. |
| 2008/0186965 A1 | 8/2008 | Zheng et al. |
| 2008/0199133 A1 | 8/2008 | Takizawa et al. |
| 2008/0212273 A1 | 9/2008 | Bechtolsheim |
| 2008/0212276 A1 | 9/2008 | Bottom et al. |
| 2008/0217021 A1 | 9/2008 | Lembcke et al. |
| 2008/0222434 A1 | 9/2008 | Shimizu et al. |
| 2008/0235443 A1 | 9/2008 | Chow et al. |
| 2008/0239649 A1 | 10/2008 | Bradicich et al. |
| 2008/0243634 A1 | 10/2008 | Dworkin et al. |
| 2008/0250181 A1 | 10/2008 | Li et al. |
| 2008/0259555 A1 | 10/2008 | Bechtolsheim et al. |
| 2008/0259788 A1 | 10/2008 | Wang et al. |
| 2008/0266793 A1 | 10/2008 | Lee |
| 2008/0270599 A1 | 10/2008 | Tamir et al. |
| 2008/0288660 A1 | 11/2008 | Balasubramanian et al. |
| 2008/0288664 A1 | 11/2008 | Pettey et al. |
| 2008/0288683 A1 | 11/2008 | Ramey |
| 2008/0301794 A1 | 12/2008 | Lee |
| 2008/0310848 A1 | 12/2008 | Yasuda et al. |
| 2008/0313369 A1 | 12/2008 | Verdoorn et al. |
| 2008/0320161 A1 | 12/2008 | Maruccia et al. |
| 2009/0021907 A1 | 1/2009 | Mann et al. |
| 2009/0044036 A1 | 2/2009 | Merkin |
| 2009/0063443 A1 | 3/2009 | Arimilli et al. |
| 2009/0064287 A1 | 3/2009 | Bagepalli et al. |
| 2009/0080428 A1 | 3/2009 | Witkowski et al. |
| 2009/0097200 A1 | 4/2009 | Sharma et al. |
| 2009/0113130 A1 | 4/2009 | He et al. |
| 2009/0133129 A1 | 5/2009 | Jeong et al. |
| 2009/0135751 A1 | 5/2009 | Hodges et al. |
| 2009/0135835 A1 | 5/2009 | Gallatin et al. |
| 2009/0158070 A1 | 6/2009 | Gruendler |
| 2009/0172423 A1 | 7/2009 | Song et al. |
| 2009/0198958 A1 | 8/2009 | Arimilli et al. |
| 2009/0204834 A1 | 8/2009 | Hendin et al. |
| 2009/0204837 A1 | 8/2009 | Raval et al. |
| 2009/0216920 A1* | 8/2009 | Lauterbach ............ H04L 49/351 710/36 |
| 2009/0219827 A1 | 9/2009 | Chen et al. |
| 2009/0222884 A1 | 9/2009 | Shaji et al. |
| 2009/0225751 A1 | 9/2009 | Koenck et al. |
| 2009/0235104 A1 | 9/2009 | Fung |
| 2009/0248943 A1 | 10/2009 | Jiang et al. |
| 2009/0251867 A1 | 10/2009 | Sharma et al. |
| 2009/0259863 A1 | 10/2009 | Williams et al. |
| 2009/0259864 A1 | 10/2009 | Li et al. |
| 2009/0265045 A1 | 10/2009 | Coxe, III |
| 2009/0271656 A1 | 10/2009 | Yokota et al. |
| 2009/0276666 A1 | 11/2009 | Haley et al. |
| 2009/0279518 A1 | 11/2009 | Falk et al. |
| 2009/0282274 A1 | 11/2009 | Langgood et al. |
| 2009/0282419 A1 | 11/2009 | Mejdrich et al. |
| 2009/0313390 A1 | 12/2009 | Ahuja et al. |
| 2010/0005331 A1 | 1/2010 | Somasundaram et al. |
| 2010/0008038 A1 | 1/2010 | Coglitore |
| 2010/0008365 A1 | 1/2010 | Porat |
| 2010/0026408 A1 | 2/2010 | Shau |
| 2010/0040053 A1 | 2/2010 | Gottumukkula et al. |
| 2010/0049822 A1 | 2/2010 | Davies et al. |
| 2010/0051391 A1 | 3/2010 | Jahkonen |
| 2010/0106987 A1 | 4/2010 | Lambert et al. |
| 2010/0118880 A1 | 5/2010 | Kunz et al. |
| 2010/0125742 A1 | 5/2010 | Ohtani |
| 2010/0125915 A1 | 5/2010 | Hall et al. |
| 2010/0138481 A1 | 6/2010 | Behrens |
| 2010/0158005 A1 | 6/2010 | Mukhopadhyay et al. |
| 2010/0161909 A1 | 6/2010 | Nation et al. |
| 2901/0138481 | 6/2010 | Behrens |
| 2010/0165983 A1 | 7/2010 | Aybay et al. |
| 2010/0169479 A1 | 7/2010 | Jeong et al. |
| 2010/0198972 A1 | 8/2010 | Umbehocker |
| 2010/0198985 A1 | 8/2010 | Kanevsky et al. |
| 2010/0218194 A1 | 8/2010 | Dallman et al. |
| 2010/0220732 A1 | 9/2010 | Hussain et al. |
| 2010/0250914 A1 | 9/2010 | Abdul et al. |
| 2010/0265650 A1 | 10/2010 | Chen et al. |
| 2010/0281246 A1 | 11/2010 | Bristow et al. |
| 2010/0299548 A1 | 11/2010 | Chadirchi et al. |
| 2010/0308897 A1 | 12/2010 | Evoy et al. |

(56) References Cited

U.S. PATENT DOCUMENTS

| | | |
|---|---|---|
| 2010/0312910 A1 | 12/2010 | Lin et al. |
| 2010/0312969 A1 | 12/2010 | Yamazaki et al. |
| 2010/0318812 A1 | 12/2010 | Auradkar et al. |
| 2011/0023104 A1 | 1/2011 | Franklin |
| 2011/0026397 A1 | 2/2011 | Saltsidis et al. |
| 2011/0029652 A1 | 2/2011 | Chhuor et al. |
| 2011/0058573 A1 | 3/2011 | Balakavi et al. |
| 2011/0075369 A1 | 3/2011 | Sun et al. |
| 2011/0090633 A1 | 4/2011 | Rabinovitz |
| 2011/0103391 A1 | 5/2011 | Davis et al. |
| 2011/0113115 A1 | 5/2011 | Chang et al. |
| 2011/0119344 A1 | 5/2011 | Eustis |
| 2011/0123014 A1 | 5/2011 | Smith |
| 2011/0138046 A1 | 6/2011 | Bonnier et al. |
| 2011/0173612 A1 | 7/2011 | El Zur et al. |
| 2011/0185370 A1 | 7/2011 | Tamir et al. |
| 2011/0191514 A1 | 8/2011 | Wu et al. |
| 2011/0191610 A1 | 8/2011 | Agarwal et al. |
| 2011/0197012 A1 | 8/2011 | Liao et al. |
| 2011/0210975 A1 | 9/2011 | Wong et al. |
| 2011/0239014 A1 | 9/2011 | Karnowski |
| 2011/0271159 A1 | 11/2011 | Ahn et al. |
| 2011/0273840 A1 | 11/2011 | Chen |
| 2011/0295991 A1 | 12/2011 | Aida |
| 2011/0296141 A1 | 12/2011 | Daffron |
| 2011/0307887 A1 | 12/2011 | Huang et al. |
| 2011/0320690 A1 | 12/2011 | Petersen et al. |
| 2012/0011500 A1 | 1/2012 | Faraboschi et al. |
| 2012/0020207 A1 | 1/2012 | Corti et al. |
| 2012/0050981 A1 | 3/2012 | Xu et al. |
| 2012/0054469 A1 | 3/2012 | Ikeya et al. |
| 2012/0054511 A1 | 3/2012 | Brinks et al. |
| 2012/0081850 A1 | 4/2012 | Regimbal et al. |
| 2012/0096211 A1 | 4/2012 | Davis et al. |
| 2012/0099265 A1 | 4/2012 | Reber |
| 2012/0131201 A1 | 5/2012 | Matthews et al. |
| 2012/0155168 A1 | 6/2012 | Kim et al. |
| 2012/0198252 A1 | 8/2012 | Kirschtein et al. |
| 2012/0207165 A1 | 8/2012 | Davis |
| 2012/0297042 A1 | 11/2012 | Davis et al. |
| 2013/0010639 A1 | 1/2013 | Armstrong et al. |
| 2013/0024645 A1 | 1/2013 | Cheriton et al. |
| 2013/0031331 A1 | 1/2013 | Cheriton et al. |
| 2013/0058250 A1 | 3/2013 | Casado et al. |
| 2013/0094499 A1 | 4/2013 | Davis et al. |
| 2013/0097448 A1 | 4/2013 | Davis et al. |
| 2013/0111107 A1 | 5/2013 | Chang et al. |
| 2013/0148667 A1 | 6/2013 | Hama et al. |
| 2013/0163605 A1 | 6/2013 | Chandra et al. |
| 2013/0275703 A1 | 10/2013 | Schenfeld et al. |
| 2013/0290643 A1 | 10/2013 | Lim et al. |
| 2013/0290650 A1 | 10/2013 | Chang et al. |
| 2013/0318269 A1 | 11/2013 | Dalal et al. |
| 2014/0122833 A1 | 5/2014 | Davis et al. |
| 2014/0359044 A1 | 12/2014 | Davis et al. |
| 2014/0365596 A1 | 12/2014 | Kanevsky et al. |
| 2015/0039840 A1 | 2/2015 | Chandra et al. |
| 2015/0103826 A1 | 4/2015 | Davis |
| 2016/0161909 A1 | 6/2016 | Wada |

FOREIGN PATENT DOCUMENTS

| | | |
|---|---|---|
| TW | M377621 | 4/2010 |
| TW | 201017430 | 5/2010 |
| WO | WO-2004/021641 | 3/2004 |
| WO | WO-2005/013143 | 2/2005 |
| WO | WO-2008/000193 | 1/2008 |
| WO | WO-2011/044271 | 4/2011 |
| WO | WO-2012/037494 | 3/2012 |

OTHER PUBLICATIONS

Chapter 1 Overview of the Origin Family Architecture from Origin and Onyx2 Theory of Operations Manual, published 1997, 18 pages.

Cisco MDS 9000 Family Multiprotocol Services Module, published 2006, 13 pages.

Comparing the I2C BUS to the SMBUS, Maxim Integrated, Dec. 1, 2000, p. 1.

Deering, "IP Multicast Extensions for 4.3BSD UNIX and related Systems," Jun. 1999, 5 pages.

Elghany et al., "High Throughput High Performance NoC Switch," NORCHIP 2008, Nov. 2008, pp. 237-240.

Extended European Search Report for EP 10827330.1, dated Jun. 5, 2013.

Final Office Action on U.S. Appl. No. 12/889,721, dated Apr. 17, 2014.

Final Office Action on U.S. Appl. No. 13/692,741, dated Mar. 11, 2015.

Final Office Action on U.S. Appl. No. 12/794,996, dated Jun. 19, 2013.

Final Office Action on U.S. Appl. No. 12/889,721, dated May 22, 2015.

Final Office Action on U.S. Appl. No. 13/234,054, dated Apr. 16, 2015.

Final Office Action on U.S. Appl. No. 13/475,713, dated Oct. 17, 2014.

Final Office Action on U.S. Appl. No. 13/475,722, dated Oct. 20, 2014.

Final Office Action on U.S. Appl. No. 13/527,498, dated Nov. 17, 2014.

Final Office Action on U.S. Appl. No. 13/527,505, dated Dec. 5, 2014.

Final Office Action on U.S. Appl. No. 13/624,725, dated Nov. 13, 2013.

Final Office Action on U.S. Appl. No. 13/624,731, dated Jul. 25, 2014.

Final Office Action on U.S. Appl. No. 13/705,340, dated Aug. 2, 2013.

Final Office Action on U.S. Appl. No. 13/705,414, dated Aug. 9, 2013.

Final Office Action on U.S. Appl. No. 14/106,698, dated Aug. 19, 2015.

Final Office Action on U.S. Appl. No. 14/334,931, dated Jul. 9, 2015.

Final Office Action on U.S. Appl. No. 13/624,731, dated Nov. 12, 2013.

fpga4fun.com,"What is JTAG?", 2 pages, Jan. 31, 2010.

From AT to BTX: Motherboard Form Factor, Webopedia, Apr. 29, 2005, p. 1.

Grecu et al., "A Scalable Communication-Centric SoC Interconnect Architecture" Proceedings 5th International Symposium on Quality Electronic Design, 2005, pp. 343, 348 (full article included).

Hossain et al., "Extended Butterfly Fat Tree Interconnection (EFTI) Architecture for Network on CHIP," 2005 IEEE Pacific Rim Conference on Communicatinos, Computers and Signal Processing, Aug. 2005, pp. 613-616.

HP Virtual Connect Traffic Flow—Technology brief, Jan. 2012, 22 pages.

International Preliminary Report on Patentability for PCT/US2009/044200, dated Nov. 17, 2010.

International Preliminary Report on Patentability for PCT/US2012/038986 dated Nov. 26, 2013.

International Preliminary Report on Patentability for PCT/US2012/061747, dated Apr. 29, 2014.

International Preliminary Report on Patentability issued on PCT/US12/62608, dated May 6, 2014.

International Search Report and Written Opinion for PCT/US12/38987, dated Aug. 16, 2012.

International Search Report and Written Opinion for PCT/US12/61747, dated Mar. 1, 2013.

International Search Report and Written Opinion for PCT/US12/62608, dated Jan. 18, 2013.

International Search Report and Written Opinion for PCT/US2010/053227, dated May 10, 2012.

(56) References Cited

OTHER PUBLICATIONS

International Search Report and Written Opinion for PCT/US2011/051996, dated Jan. 19, 2012.
International Search Report and Written Opinion on PCT/US09/44200, dated Jul. 1, 2009.
International Search Report and Written Opinion on PCT/US2012/038986, dated Mar. 14, 2013.
Jansen et al., "SATA-IO to Develop Specification for Mini Interface Connector" Press Release Sep. 21, 2009, Serial ATA3 pages.
Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.
Non-Final Action on U.S. Appl. No. 13/728,362, dated Feb. 21, 2014.
Non-Final Office Action on U.S. Appl. No. 12/889,721, dated Jul. 2, 2013.
Non-Final Office Action on U.S. Appl. No. 13/475,722, dated Jan. 17, 2014.
Non-Final Office Action on U.S. Appl. No. 12/794,996, dated Sep. 17, 2012.
Non-Final Office Action on U.S. Appl. No. 12/889,721, dated Oct. 11, 2012.
Non-Final Office Action on U.S. Appl. No. 12/889,721, dated Sep. 29, 2014.
Non-Final Office Action on U.S. Appl. No. 13/234,054, dated Oct. 23, 2014.
Non-Final Office Action on U.S. Appl. No. 13/234,054, dated Aug. 6, 2015.
Non-Final Office Action on U.S. Appl. No. 13/284,855, dated Dec. 19, 2013.
Non-Final Office Action on U.S. Appl. No. 13/453,086, dated Mar. 12, 2013.
Non-Final Office Action on U.S. Appl. No. 13/475,713, dated Apr. 1, 2014.
Non-Final Office Action on U.S. Appl. No. 13/527,505, dated May 8, 2014.
Non-Final Office Action on U.S. Appl. No. 13/527,498, dated May 8, 2014.
Non-Final Office Action on U.S. Appl. No. 13/624,725, dated Jan. 10, 2013.
Non-Final Office Action on U.S. Appl. No. 13/624,725, dated Apr. 23, 2015.
Non-final office action on U.S. Appl. No. 13/624,731 dated Jan. 29, 2013.
Non-Final Office Action on U.S. Appl. No. 13/662,759, dated Nov. 6, 2014.
Non-Final Office Action on U.S. Appl. No. 13/692,741, dated Sep. 4, 2014.
Non-Final Office Action on U.S. Appl. No. 13/692,741, dated Jul. 1, 2015.
Non-Final Office Action on U.S. Appl. No. 13/705,286, dated May 13, 2013.
Non-Final Office Action on U.S. Appl. No. 13/705,340, dated Mar. 12, 2014.
Non-Final Office Action on U.S. Appl. No. 13/705,340, dated Mar. 29, 2013.
Non-Final Office Action on U.S. Appl. No. 13/705,414, dated Apr. 9, 2013.
Non-Final Office Action on U.S. Appl. No. 13/728,308, dated May 14, 2015.
Non-Final Office Action on U.S. Appl. No. 13/728,428, dated Jun. 12, 2015.
Non-Final Office Action on U.S. Appl. No. 14/052,723, dated May 1, 2015.
Non-Final Office Action on U.S. Appl. No. 14/106,697, dated Aug. 17, 2015.
Non-Final Office Action on U.S. Appl. No. 14/106,698, dated Feb. 12, 2015.
Non-Final Office Action on U.S. Appl. No. 14/334,931, dated Jan. 5, 2015.
Non-Final Office Action on U.S. Appl. No. 13/705,428, dated Jul. 10, 2013.
Notice of Allowance on U.S. Appl. No. 13/453,086, dated Jul. 18, 2013.
Notice of Allowance on U.S. Appl. No. 13/475,713, dated Feb. 5, 2015.
Notice of Allowance on U.S. Appl. No. 13/475,722, dated Feb. 27, 2015.
Notice of Allowance on U.S. Appl. No. 13/527,498, dated Feb. 23, 2015.
Notice of Allowance on U.S. Appl. No. 13/527,505, dated Mar. 6, 2015.
Notice of Allowance on U.S. Appl. No. 13/624,731, dated Mar. 5, 2015.
Notice of Allowance on U.S. Appl. No. 13/705,340, dated Dec. 3, 2014.
Notice of Allowance on U.S. Appl. No. 13/705,386, dated Jan. 24, 2014.
Notice of Allowance on U.S. Appl. No. 13/705,414, dated Nov. 4, 2013.
Notice of Allowance on U.S. Appl. No. 13/284,855, dated Jul. 14, 2014.
Notice of Allowance U.S. Appl. No. 13/728,308, dated Oct. 7, 2015.
Office Action on Taiwan Application 101139729, dated May 25, 2015 (English translation not available).
Pande et al., "Design of a Switch for Network on Chip Applications," May 25-28, 2003 Proceedings of the 2003 International Symposium on Circuits and Systems, vol. 5, pp. V217-V220.
Reexamination Report on Japanese Application 2012-536877, dated Jan. 22, 2015 (English Translation not available).
Search Report on EP Application 10827330.1, dated Feb. 12, 2015.
Venaas, "IPv4 Multicast Address Space Registry," 2013, http://www.iana.org/assignments/multicast-addresses/multicast-addresses.xhtml.
Final Office Action on U.S. Appl. No. 14/334,178, dated Nov. 4, 2015.
Office Action on Taiwan Application 100133390, dated Aug. 25, 2015 (English translation not available).
Final Office Action on U.S. Appl. No. 14/052,723, dated Dec. 3, 2015.
Non-Final Office Action on U.S. Appl. No. 14/334,178 dated Dec. 18, 2015.
Non-Final Office Action on U.S. Appl. No. 14/334,931 dated Dec. 11, 2015.
Notice of Allowance on U.S. Appl. No. 13/692,741 dated Dec. 4, 2015.
Final Office Action on U.S. Appl. No. 13/234,054, dated Jan. 26, 2016.
Final Office Action on U.S. Appl. No. 14/106,697 dated Feb. 2, 2016.
Non-Final Office Action on U.S. Appl. No. 14/725,543 dated Apr. 7, 2016.
Notice of Allowance on U.S. Appl. No. 13/624,725, dated Mar. 30, 2016.
Final Office Action on U.S. Appl. No. 13/728,428 dated May 6, 2016.
Notice of Allowance on U.S. Appl. No. 14/334,931 dated May 20, 2016.
Notice of Allowance on U.S. Appl. No. 13/662,759 dated May 10, 2016.
Notice of Allowance on U.S. Appl. No. 14/334,178 dated Jun. 8, 2016.
Final Office Action on U.S. Appl. No. 12/889,721 dated Aug. 2, 2016.
Non-Final Office Action on U.S. Appl. No. 13/234,054 dated Oct. 20, 2016.
Notice of Allowance on U.S. Appl. No. 14/106,697 dated Oct. 24, 2016.
Non-Final Office Action on U.S. Appl. No. 14/753,948 dated Nov. 4, 2016.
Final Office Action on U.S. Appl. No. 13/234,054 dated May 31, 2017.

(56) References Cited

OTHER PUBLICATIONS

Final Office Action on U.S. Appl. No. 15/281,462 dated Jun. 13, 2017.
Non-Final Office Action on U.S Appl. No. 15/254,111 dated Jun. 20, 2017.
Notice of Allowance on U.S. Appl. No. 14/753,948 dated Jun. 14, 2017.
Non-Final Office Action on U.S. Appl. No. 15/270,418 dated Apr. 21, 2017.
Notice of Allowance on U.S. Appl. No. 15/360,668, dated May 5, 2017.
HP ProLiant SL6500 Scalable System, Family data sheet, HP Technical sheet, Sep. 2010 4 pages.
Non-Final Office Action on U.S. Appl. No. 15/281,462 dated Feb. 10, 2017.
Notice of Allowance issued on U.S. Appl. No. 14/052,723, dated Feb. 8, 2017.
Non-Final Office Action on U.S. Appl. No. 15/078,115 dated Sep. 5, 2017.
Notice of Allowance on U.S. Appl. No. 13/234,054, dated Sep. 19, 2017.
Notice of Allowance on U.S. Appl. No. 15/254,111 dated Sep. 1, 2017.
Notice of Allowance on U.S. Appl. No. 15/270,418 dated Nov. 2, 2017.
Das et al., "Unifying Packet and Circuit Switched Networks," IEEE Globecom Workshops 2009, Nov. 30, 2009, pp. 1-6.
Final Office Action on U.S. Appl. No. 13/624,725 dated Mar. 10, 2016.
Final Office Action on U.S. Appl. No. 13/662,759, dated Feb. 22, 2016.
Non-Final Office Action on U.S. Appl. No. 12/889,721, dated Feb. 24, 2016.
Notice of Allowance on U.S. Appl. No. 13/728,428 dated Jul. 18, 2016.
Notice of Allowance on U.S. Appl. No. 14/725,543 dated Jul. 21, 2016.
Non-Final Office Action on U.S. Appl. No. 15/281,462 dated Dec. 15, 2017.
Non-Final Office Action on U.S. Appl. No. 15/357,332 dated Nov. 9, 2017.
Non-Final Office Action on U.S. Appl. No. 15/042,489 dated Jan. 9, 2018.
Notice of Allowance on U.S. Appl. No. 15/078,115 dated Jan. 8, 2018.
Notice of Allowance on U.S. Appl. No. 15/430,959 dated Mar. 15, 2018.

\* cited by examiner

NODE CARD MANAGEMENT IN A MODULAR AND LARGE SCALABLE SERVER SYSTEM

RELATED APPLICATION/PRIORITY CLAIMS

This application is a continuation of Ser. No. 13/527,505, filed Jun. 19, 2012, which claims the benefit under 35 USC 119(e) of U.S. Provisional Patent Application Ser. No. 61/553,555 filed on Oct. 31, 2011 and entitled "System And Method For Modular Compute Provisioning In Large Scalable Processor Installations", the entireties of which are incorporated herein by reference.

This application is also related to U.S. patent application Ser. No. 13/527,498, filed on the same date and entitled "Node Cards for a System and Method for Modular Compute Provisioning in Large Scalable Processor Installations", the entirety of which is also incorporated herein by reference.

FIELD

The disclosure relates generally to provisioning of modular compute resources within a system design.

BACKGROUND

Server systems generally provide a fixed number of options. For example, there are usually a fixed number of CPU sockets, memory DIMM slots, PCI Express IO slots and a fixed number of hard drive bays, which often are delivered empty as they provide future upgradability. The customer is expected to gauge future needs and select a server chassis category that will serve present and future needs. Historically, and particularly with x86-class servers, predicting the future needs has been achievable because product improvements from one generation to another have been incremental.

With the advent of power optimized, scalable servers, the ability to predict future needs has become less obvious. For example, in this class of high-density, low-power servers within a 2 U chassis, it is possible to install 120 compute nodes in an incremental fashion. Using this server as a data storage device, the user may require only 4 compute nodes, but may desire 80 storage drives. Using the same server as a pure compute function focused on analytics, the user may require 120 compute nodes and no storage drives. The nature of scalable servers lends itself to much more diverse applications which require diverse system configurations. As the diversity increases over time, the ability to predict the system features that must scale becomes increasingly difficult.

It is desirable to provide smaller sub-units of a computer system that are modular and can be connected to each other to form larger, highly configurable scalable servers. Thus, it is desirable to create a system and method to modularly scale compute resources in these power-optimized, high density, scalable servers.

DETAILED DESCRIPTION OF ONE OR MORE EMBODIMENTS

The disclosure is particularly applicable to examples of the system board and node cards illustrated and described below and it is in this context that the disclosure will be described. It will be appreciated, however, that the disclosure has broader applicability since the disclosed system and node cards can be implemented in different manners that are within the scope of the disclosure and may be used for any application since all of the various applications in which the system and node cards may be used are within the scope of the disclosure.

Figure 1A:
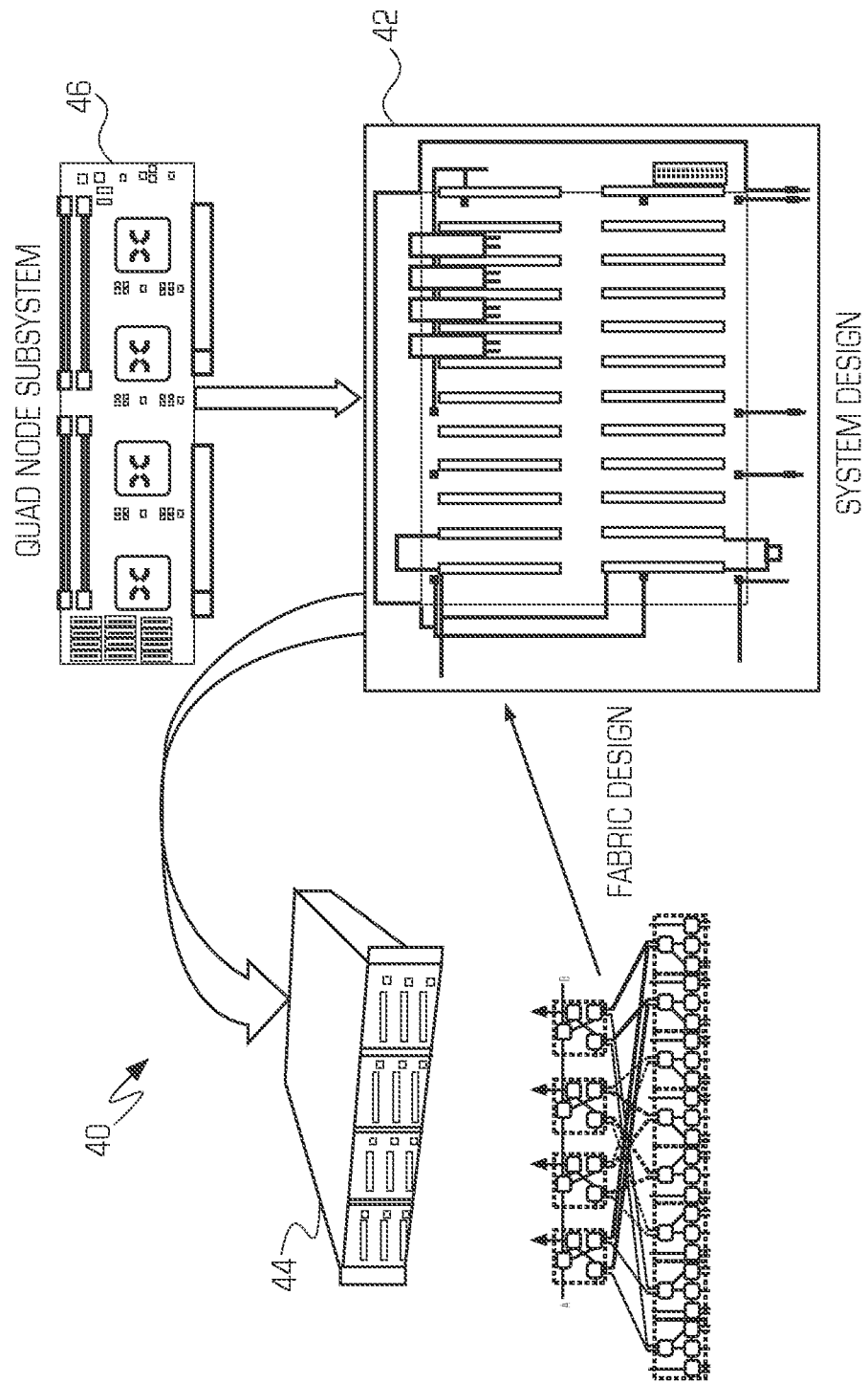
FIG. 1A illustrates an example of a system board on which one or more node cards may be installed.

FIG. 1A illustrates an example of a system 40 that may include a system board 42 on which one or more node cards may be installed. The system board 42 may be fit into a typical server chassis 44 and the system board may have one or more node card units 46 (described below with reference to FIG. 2) plugged into the system board. There are a number of functions that are needed to complete a full classic server which includes Ethernet PHYs to interface the one or more node cards 46 or a cluster of node cards and server control functions (fan control, buttons etc. . . . ). The system board 42 is the component that ties the node cards 46 to these components. The system board 42 is desirable if a hierarchical hardware partition is desired where the "building block" is smaller than the desired system, or when the "building block" is not standalone. The system board roles can include: Ethernet network connectivity, internal fabric connections between node cards or groups node cards in a sub-system (the fabric design in FIG. 1) and chassis control and management. The system board is the component that connects the fabric links between node cards and allows them to communicate with the external world. Once the fabric design, hardware partitioning and storage decisions have been made, the system board 42 can glue the system components together and the input/output (I/O) of the system may include: management data input/output (MDIO) for communication with SFP network devices, comboPHYs for internal fabric links, storage and Ethernet access, UART and JTAG ports for debug and SMBus and GPIOs for chassis component control and communication.

The fabric connections on the node card can be designed to balance: usage of SoC PHYs, link redundancy, link bandwidth and flexibility in usage of the 8 links at the edge connectors. A node card can be used in conjunction with the "system board" where the system board provides power to the node cards and connections to interconnect off the system board such as an Ethernet transceiver. The system board could house one or more node cards. In the case of housing more than one node card, the system board creates a cluster of Servers that utilize a server to server interconnect or fabric that is integrated in the SoC or a separate function on the card. This system board can be made in many forms, including industry standard form factors such as ATX or in customer form factors. The system board could be a blade or could fit into a standard chassis such as a 2 U or any other size.

Figure 1B:
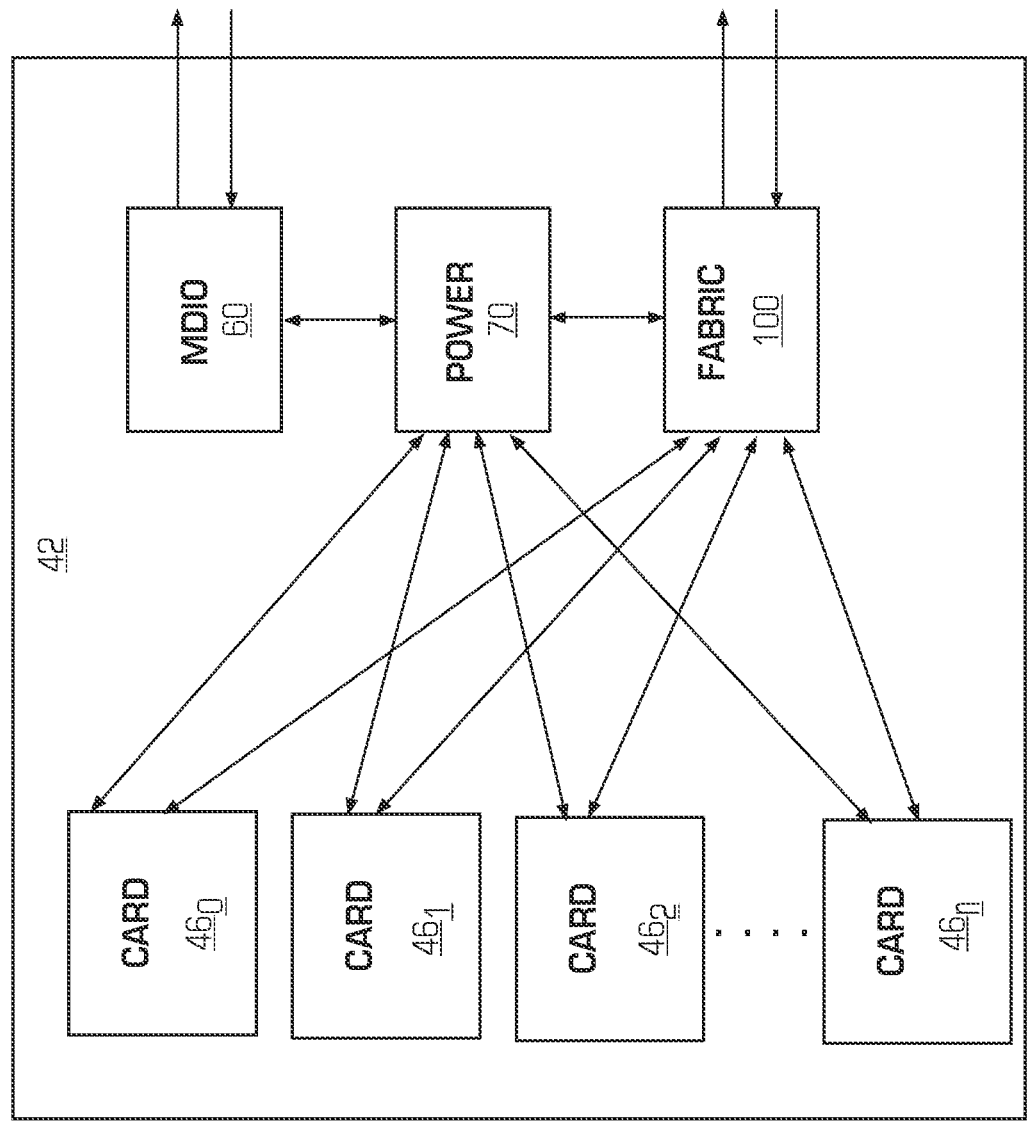
FIG. 1B illustrates more details of the system board.

FIG. 1B illustrates more details of the system board 42. The system board 42 may allow one or more node cards 46 (such as 46.sub.0, 46.sub.1, 46.sub.2, . . . , 46n in the example in FIG. 1B) to be plugged into the system board. The system board 42 also may house a management data input/output system 60 (described below with reference to FIG. 3) that manages the system board and the node cards, a power system 70 (described below with reference to FIGS. 4-5) that distributes power to the system board 42 as well as the one or more node cards 46 and a switch fabric 100 (described below with reference to FIG. 7) that provide communication paths between the nodes on each node card, between the node cards and to an outside entity such as another system board, other computer system and the like.

Figure 2:
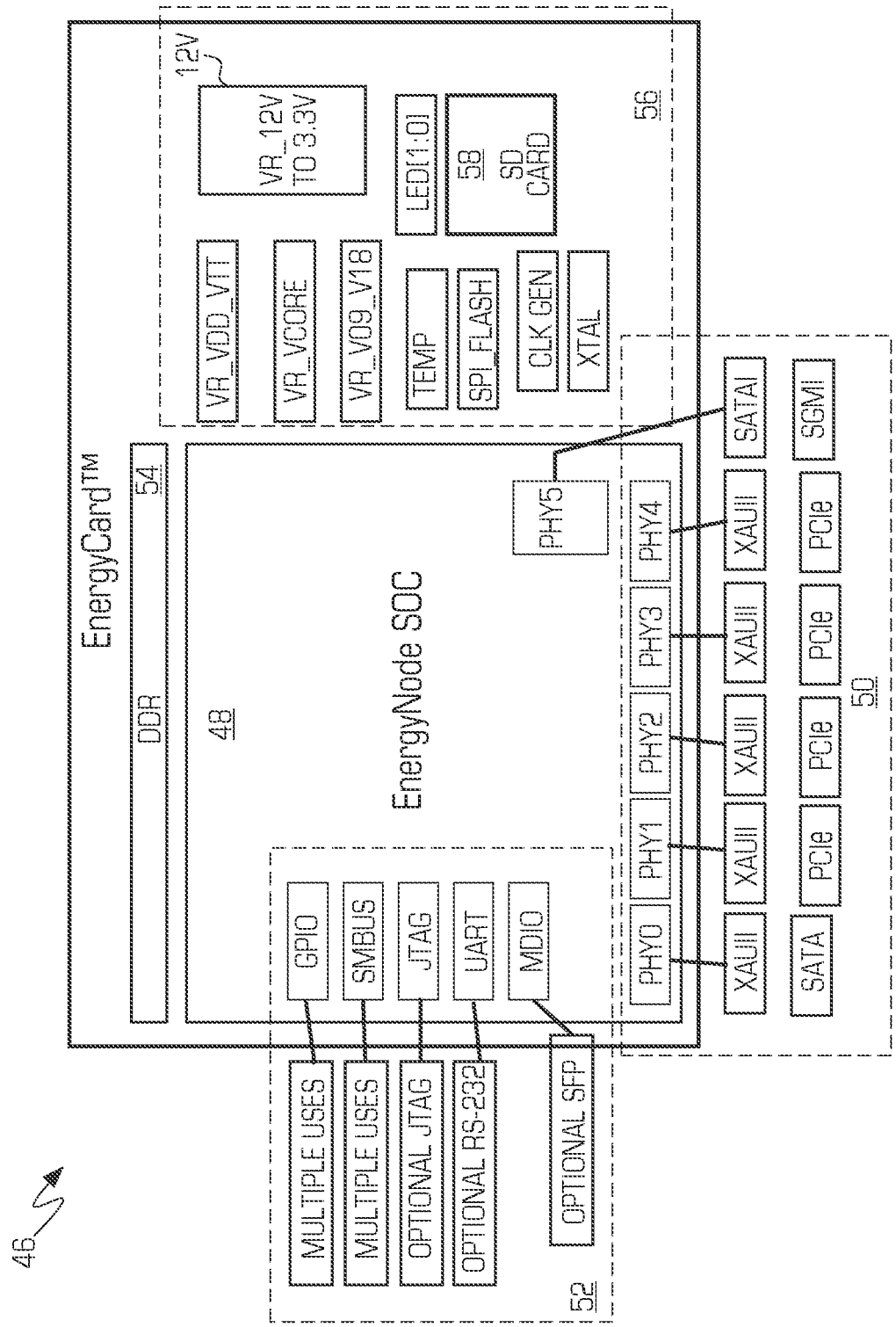
FIG. 2 illustrates an example of a node card that can be coupled to the system board.

FIG. 2 illustrates an example of a node card 46, such as a node card, that can be coupled to the system board. The node card may have a system on a chip (SOC) unit 48, one or more PHYs to various communication and storage paths 50 and one or more other interfaces 52 that were described briefly above. The node card 46 may also have a memory 54, one or more other well known modules 56 (such as a clock, a crystal, a temperature sensor, a regulator and a power source) that are also part of the node card. The node card may also have an SD card unit 58.

Figure 3:
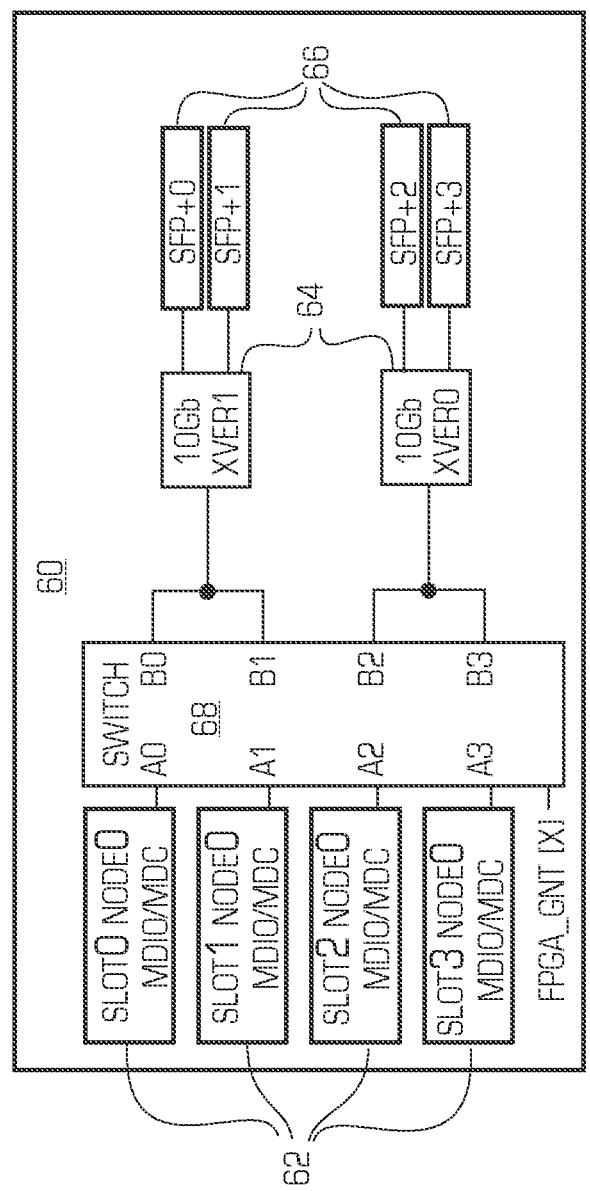
FIG. 3 illustrates the management data input/output (MDIO) of the system board.

FIG. 3 illustrates the management data input/output (MDIO) 60 of the system board. The node card in FIG. 2 can support 1 G and 10 G Ethernet speeds. For 10 G link speeds, a XAUI to SFP+ conversion is required (by a transceiver 64). This example shows 2 SFP+ to XAUI links available so a system board can use 1 or 2 Outlinks. FIG. 3 illustrates the MDIO connectivity 62 for a 4 SFP Outlink 66 SystemBoard design that utilizes a switch 68 to share MDIO signals. FPGA_GNT[X] is the output of an arbiter that allows access by various slots to communicate with SFP devices through an Ethernet PHY transceiver 64.

The system board also provides chassis management mechanism that may include fan control, a chassis user interface (buttons, LEDs, etc.) and system voltage regulation for Ethernet transceivers, node card slots in the system board as shown in FIG. 1 (that provide power to each node card) and SATA devices. Now, an example of a power system of the system board is described in more detail.

Figure 4:
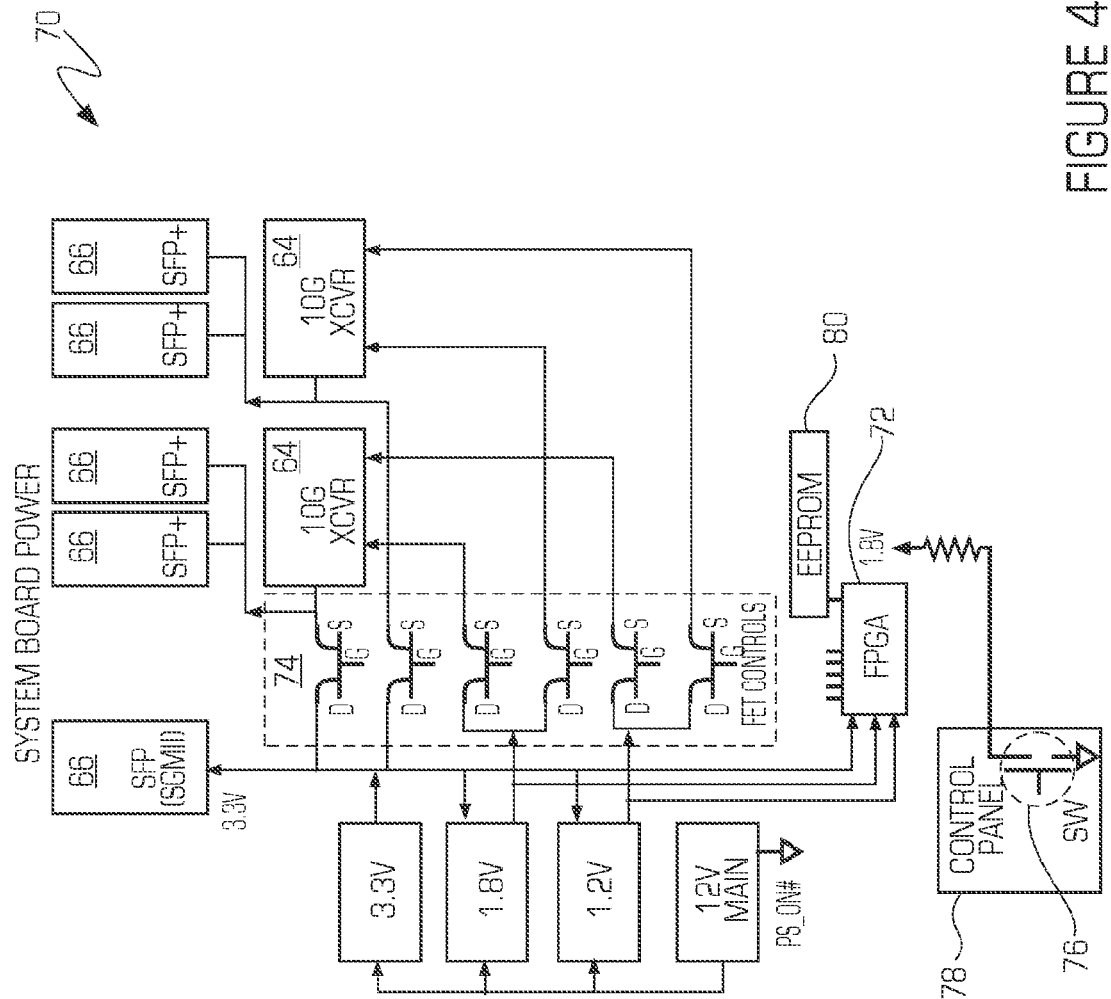
FIGS. 4 and 5 illustrate details of the power system for the system board.
Figure 5:
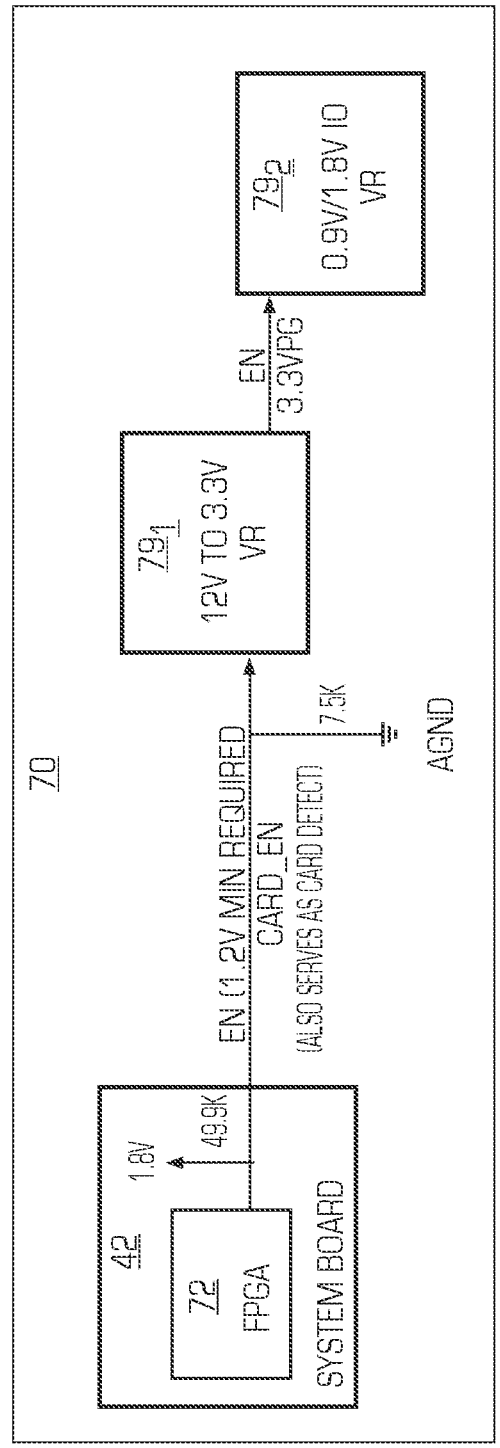

FIGS. 4 and 5 illustrate details of the power system 70 for the system board that, for example, powers the network system 64 and 66. The system board power system should be able to generate and distribute DC voltage requirements of the node cards and system components, have an organized power sequencing, a predetermined power control for each slot and/or system component (always on or under dynamic control) and be able to provide dynamic power control. The system board design utilizes a chassis management unit 72, such as an FPGA, in communication with a node card to meet the proper power-on sequence and dynamic power control of the components. The chassis management unit 72 may be responsible for the power on/off sequence for the chassis and the power system has one or more power FETs 74 that are available to dynamically control the high power Ethernet PHYs and elements of the network system 64,66. The power system may also provide 12 V to each slot holding the node cards, such as node card(s), to provide power to each node card. Furthermore, each node card (or multi-node) slot on the system board has a CARD_EN signal (shown for example in FIG. 5) to enable the 3.3 V, 1.8 V and 0.9 V rails to power on/off a node card or node(s) of a node card. In the power system, with the PS_ON# grounded (shown in FIG. 4), the 12 V supply may power up the system board when AC power is supplied. A power switch 76 on the control panel 78 turns power on/off to each slot of the system board, but does not remove power from the chassis management unit 72 and a power switch 76 button press causes the chassis management unit 72 to shut down all slot power.

The power system may have intermediate modes that are controlled by the chassis management unit 72 and those modes are to enable the 10 G transceivers 64 or to enable other slots. The lower operational power state of the power system is that the system board is powered, most 10 G transceiver power FETs are off, slot 0 is powered and enabled and nodes 1 and 2 on slot 0 are disabled. Minimal network system devices need to remain on such that a single network connection is maintained for slot 0, to provide a communication channel with higher level control systems. For unexpected power loss, the chassis management unit 72 stores the current system power configuration in a local non-volatile storage device 80 and restores that configuration when AC power is restored.

FIG. 5 illustrates more details of the power system 70 with the chassis management unit 72 on the system board 42. The chassis management unit 72 may be connected to one or more regulators 79 that convert and regulate the voltage of the system such as 3.3 volt supply and a 1.8 volt I/O supply.

The chassis can have a number of miscellaneous components related to temperature control (fans and temperature sensors) and user interface (button, LEDs, LCDs). The node card I/O has been defined for communication and control of these components. In the system board design, the chassis management unit 72 serves the role of controlling the fans, user interface features and communication to node card(s) through an SMBus connection. The following functions outlines the node card I/O for system communication and control:

SMBus Clock signal for communication with system board devices.

SMBus Data signal for communication with system board devices.

Interrupt to report a system event to the node.

Report a thermal trip event that occurred external to the node.

For general purpose use with a system board.

CPLD_REQ and CPLD_GNT are used for master arbitration between the nodes.

CPLD_REQ and CPLD_GNT are used for master arbitration between the nodes.

Figure 6:
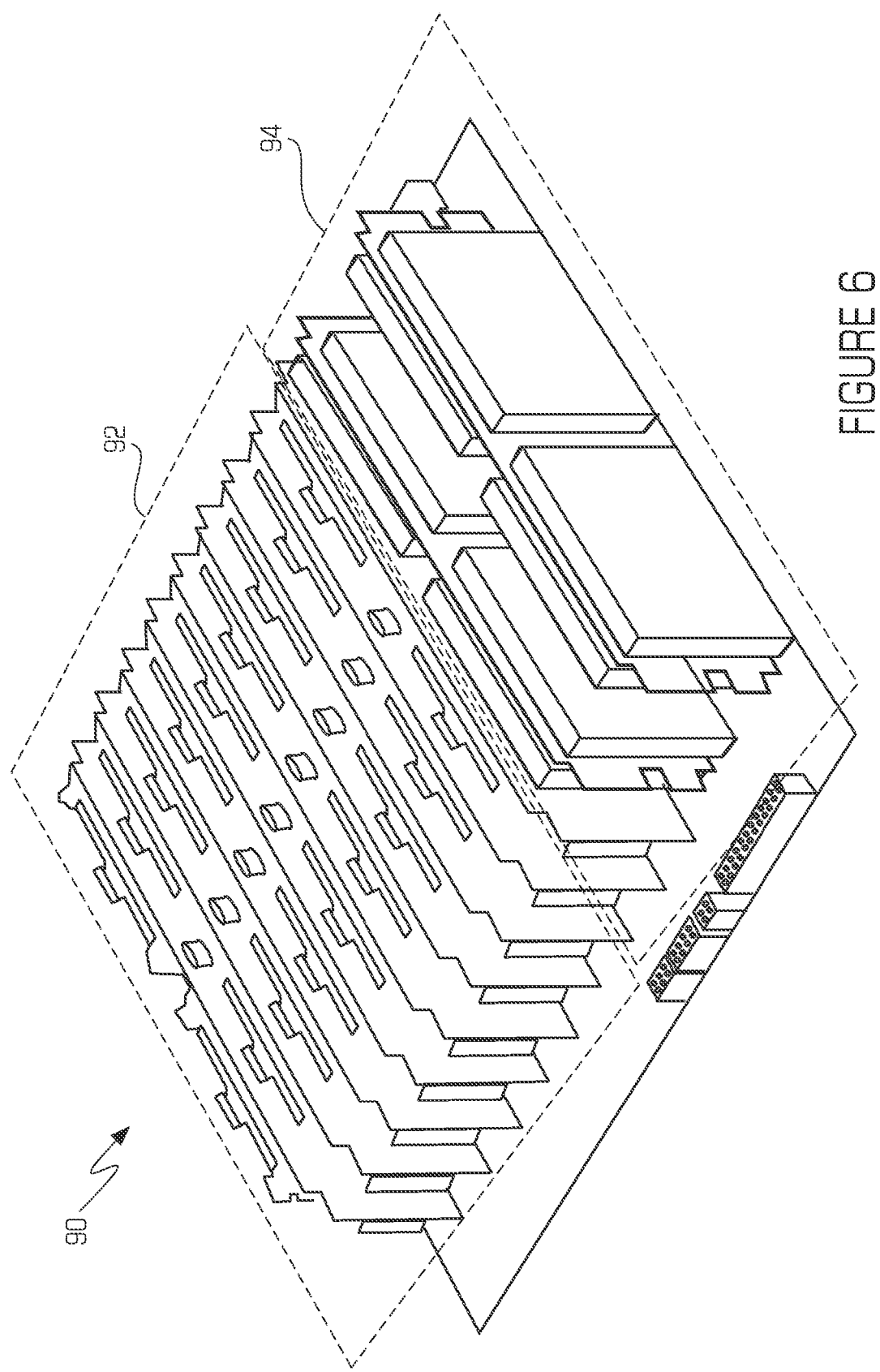
FIG. 6 illustrates an example of an EnergyDrive that can be coupled to the system board.

An SB12 (an example of which is shown in FIG. 6) is a 12 slot system board 80 that accepts a node card per slot (described in co-pending patent application Ser. No. 13/527,498 filed on Jun. 19, 2012, which is incorporated herein by reference.) It is intended for use in a 2 U chassis that supports EATX motherboards. While the SB12 is primarily passive for fabric routing, there are still some other functions that it performs that include fabric interconnect between node cards, conversion from XAUI to SFP+ cages for external network connectivity, local DC voltage regulation, multiplexing of UART signals from slots 1-4 to the external RS-232 port, fan control and/or power sequencing and enable/disable of slots. In the example in FIG. 6, the SB 12 has one or more node card quad-node boards 92 and one or more EnergyDrives 94 that are described in more detail in co-pending patent application Ser. No. 13/284,855 filed on Oct. 28, 2011 and entitled "System And Method For Flexible Storage And Networking Provisioning In Large Scalable Processor Installations", the entirety of which is incorporated by reference herein.

Figure 7:
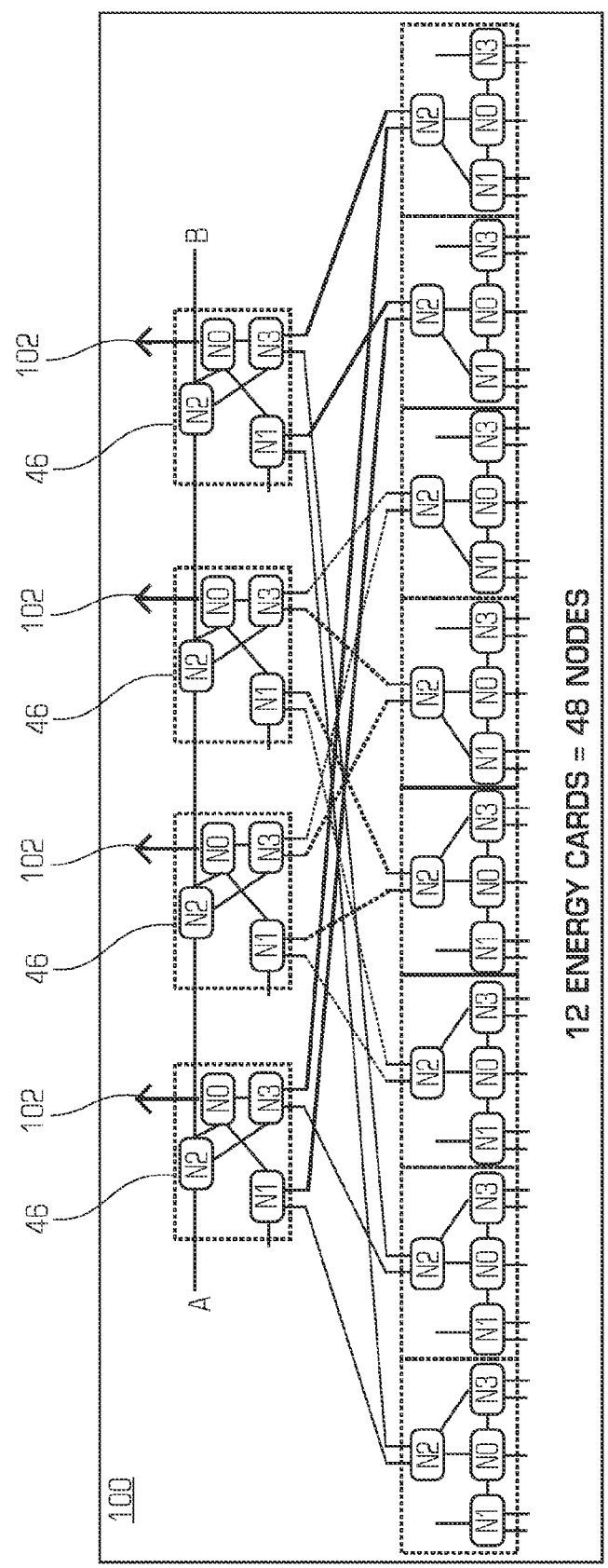
FIG. 7 illustrates details of the fabric interconnect of the system board.

FIG. 7 illustrates details of a fabric interconnect 100 of the system board. The fabric interconnect is designed to balance the need for scalable bandwidth, redundant links, and the physical routing congestion within the system board. There are many other tree topologies that can be implemented at this level. For the conversion from XAUI to SFP+ cages, an Ethernet transceiver is used. In short, a set of arrows 102 in the fabric diagram in FIG. 8 connect to the Vitesse transceiver which then connects to the SFP+ cage. Within the SFP+ cage, the user is free to install a compatible SFP module (1 Gb or 10 Gb), (copper or fiber) to meet their needs. SFP cables with integrated SFP connectors can also be used. The fabric also connects one or more node cards 46 together as well as one or more nodes of each node card (N0-N3) to each other so that they can communicate with each other.

Figure 8:
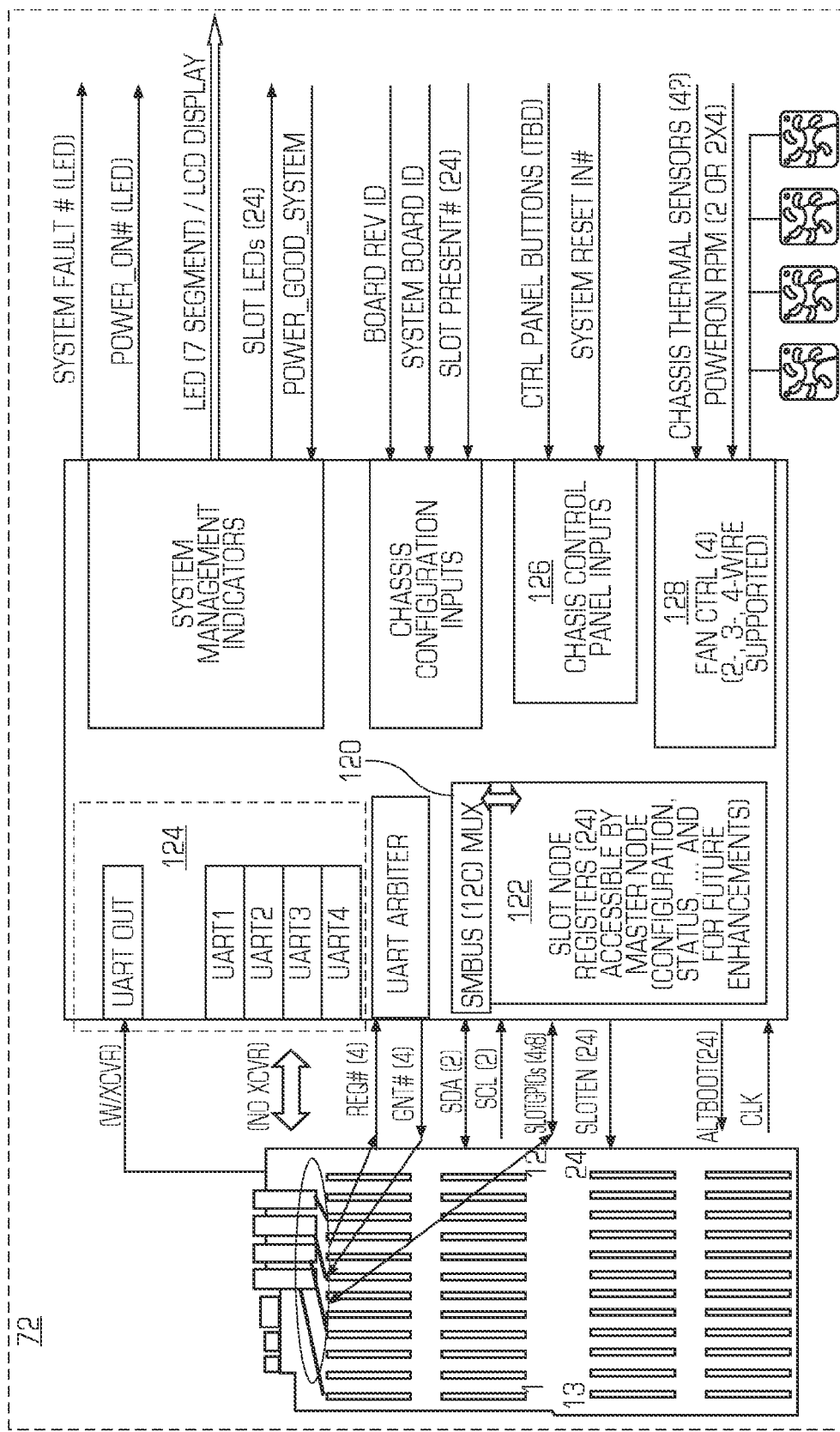
FIG. 8 illustrates details of the chassis management unit of the system board.

FIG. 8 illustrates details of the chassis management unit 72 of the system board. This device will be used on system boards for chassis management functions and node card to system board configuration/coordination. It will work on multiple system boards (1 to 24 slot) without modification, but can be modified if needed, for example, one could use a smaller device on a 3-slot system board (fewer I/Os required). It also can scale upward to support slots quantities that are limited only by the allowable size of the system fabric. In one implementation, the chassis management unit 72 may be a FPGA.

The chassis management unit 72 may have external network slots which are the node card slots that have connections to the system board SFPs for connection to the external network and the internal fabric are the XAUI connections that exist between node card, both on system board cards and between slots in which node cards are installed. The system may have a master node (within one of the node cards) that has been assigned to control the other nodes and/or the other node cards. The master node card is a single node card on a node card installed in an external network slot that is designated to carry out chassis management functions (by way of the Node Controller). If arbitration is supported, node card in another external network slot can be switched to function in this role. The master node card is a system board card that is installed in an External Network Slot and a system Register Space 122 is a common system registers accessible via the node card SMBus 120 (includes bits for things such as chassis reset, power on/off, slot reset, FAULT status, etc.).

The power management of the chassis management unit 72 includes the code and I/O signals to support power-on and reset requirements of system board and node card components. Power on of installed system board cards is controlled by the chassis management unit 72 and the Master node card. The slot power and timing may be hardwired to the chassis management unit 72, but may also be controlled via a Master node card.

The chassis management unit 72 also performs arbitration of system board Resources and the system board resources are accessible by the Master node card at a time by way of chassis management unit 72 controlled arbitration between the 4 master node cards. The GPIOs CPLD_REQ and CPLD_GNT are connected to the node cards through External Network Slots (Slots 0-3).

The MDIO Bus (MII bus) is a shared resource of the master node cards. It is used by the Master node card to access the Media Independent Interface of the Ethernet transceiver for their configuration. Note that one Master node card has the ability to access the MDIO of a transceiver to which it does not connect. The External Slot node cards will need to coordinate to avoid conflicts.

A set of UARTs 124, a system board DB9/RS232 transceiver, is a shared resource of the master node cards. Only the Master node card will have access to the transceiver and be able to use its UART interface to communicate externally from the chassis.

System Board Configuration Inputs

The system board has the following inputs for system configuration that are read by the chassis management unit 72 and made available to Master node card via the System Register Space:

Board Rev ID—Used as needed to provide distinction between board versions/assemblies.

System board ID—Used as needed to provide distinction between different system boards, e.g., between OEM variants of the system board.

Slot Presence When a card is first installed, the chassis management unit 72 will detect its presence by the card's internal pullup to this signal. The chassis management unit 72 will record this presence status in the System Register Space. Furthermore, when the chassis management unit 72 enables power to the slot via this signal, it will drive the line low. The presence state is recalled via the original presence detected and stored into the System Register Space.

The chassis control panel 126 includes any Buttons, LEDs or other device that would be on the chassis for user input. The control panel is driven by the chassis management unit 72 and accessible by the master node card through the System Register Space. Fans are driven by a fan control unit 128 that is part of the chassis management unit 72 and controlled by the Master node card through the System Register Space.

JTAG is used update the firmware image on the chassis management unit 72. This is performed by a JTAG connection between the node card edge connector in Slot 0 and the chassis management unit 72. The other node card slots will not be connected to keep the JTAG bus clean.

The system board may contain multiple physical connectors, contain routing between the physical connectors for power and signaling, and one or more Ethernet physical connections, where the physical connectors connect to a PCB on which is one or more servers. The connectors, in one embodiment, may be PCIe. The routing between the connectors may be using XAUI and/or SGMII. The power may be 12 v where 12 v is generated on the system board from an AC or higher voltage applied to the system board. The system board may be in a chassis that fits in a rack and/or it may be a blade. The system board may include additional systems that can be placed inside the chassis where the power and signal routing goes through a board that is connected with one or more connectors on board forming a bridge without any additional wires. The system board may have an ATX form factor. If SGMII is used, it may be routed from one physical connectors to a 1 Gbit PHY that is used to connect to a standard Ethernet cable. When one or more SGMII signals from additional connector(s) are used, they are routed to additional Ethernet PHYs enabling multiple Ethernet cable to be hooked to the system board. The system board may also have regulation for the Ethernet. The system board also has a device that goes from XAUI to the output that goes to a PHY and/or has SFP cages on it.

In another aspect, a chassis controller 72 may have a system controller that provides enable signaling to each connector. The system controller may be implemented in many ways, such as programmable logic (an FPGA) or cold logic (a standard microcontroller or a fixed-function ASIC). The system controller may be any type of processor with memory and GPIO interface. The system controller may include SMBus arbitration where the chassis manager has the lock that controls the arbitration. In one embodiment, there may be no processor on the system board other than the chassis management unit and the Ethernet transceiver. The chassis controller may have a regulator for Ethernet and Chassis Management unit.

The power button may be routed from chassis to chassis controller so that when power button is pressed one or more node cards is notified and that node card sends a message to all node cards to gracefully shut down. There may be serial port connector so chassis manager can communicate over the serial port to external devices. The system control can enable and control the Ethernet PHYs and node cards. A given node card can have a digital link to the system controller enabling a server within that node card to communicate to or control the system controller. There may also be more than one server within node cards that can communicate with the system controller through one of multiple independent links and a shared digital link. The shared digital link is a SMBus channel with digital controls that enable arbitration of said channel. The system control may have lights and chassis control of slot enable. The connector interface may have XAUI, power and a digital enable signal. There may be a node card that can control the enable of other servers by giving commands to the chassis manager to enable or disable a server or set of servers in another slot by communicating with the chassis manager who enables or disables a slot through a digital GPIO. In the system, any server can request to be turned off by sending a message to the server connected to the chassis manager that controls the enable.

The system controller or system board may have one or more temperature sensors. The temperature sensors may be connected to the system controller enabling the temperature sensors to be read and controlled by the system controller. The node card can get temperature information by communicating with the system controller, where the system controller gets temperature information from one or more temperature sensors on the system board. In addition, more than one server can get temperature information.

The system board may have outputs that connect to fans. The fan speed can be set by setting DIP switches or other values on the system board independent to the system controller or node cards. There may also be fan(s) on system board. The chassis controller unit may make decisions on fan speed using the temperature sensor input independent of the node cards. In addition, one node card can get temperature information from the chassis manager and make decisions on fan speed and tell the chassis manager how to set up the fans. In other embodiments, the main server can get information from each server on temperature and make a fan decision, then talk to the chassis manager to change fan speed.

The system board may also include drives and SATA and it may houseEnergyDrive, including power and enable. Inclusion of SATA channels within the system board allows connectivity between EnergyDrives and servers within a node card without the use of a multitude of cabling. There may also be disks mounted on the system board that make use of the embedded SATA channels.

Now, several different examples of node cards that may be plugged into the system board are described in more detail.

Figure 9:
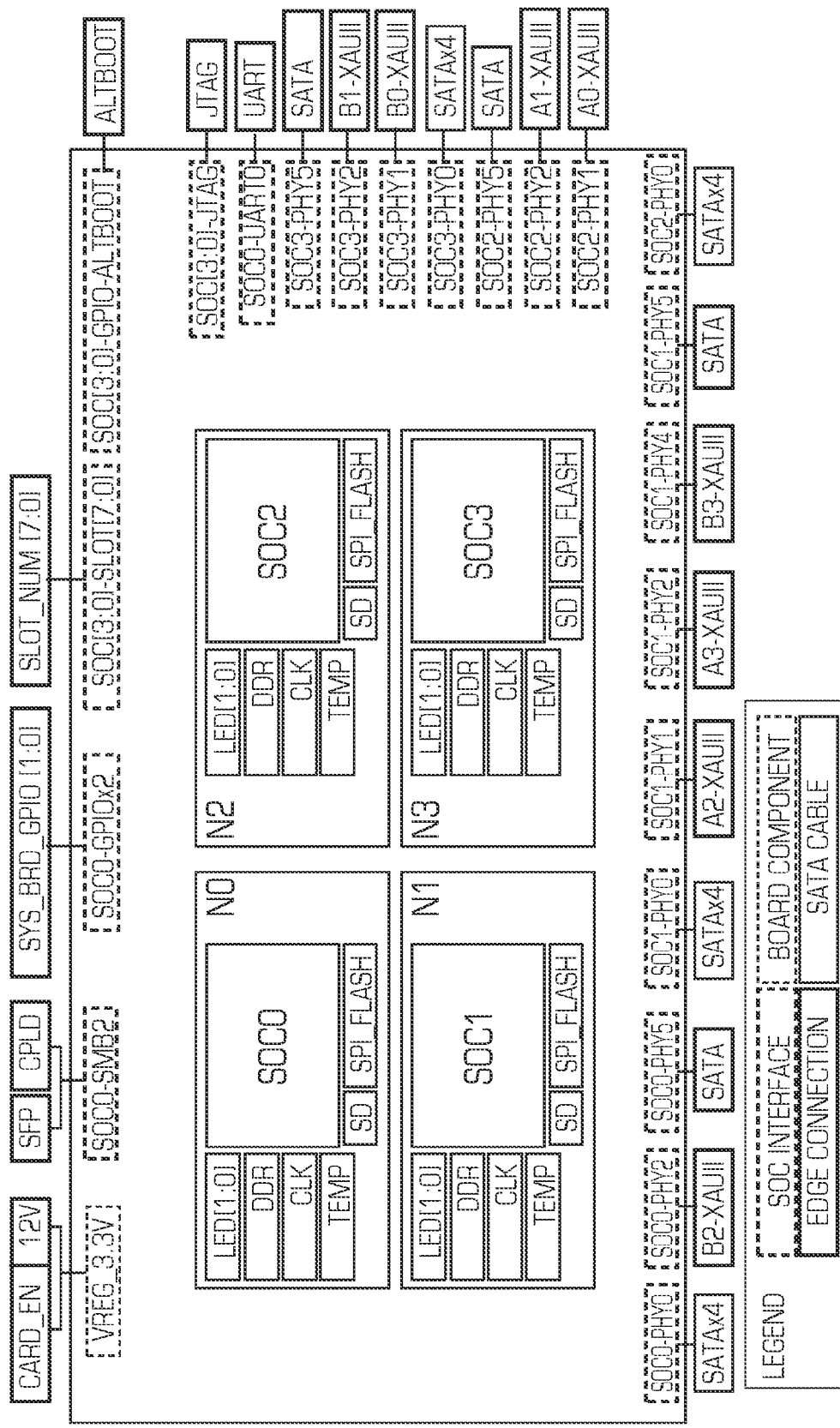
FIG. 9 illustrates an embodiment of the details of each node card.

A highly integrated SoC designed for Server application enables density and system design options that have not been available to date. Cards can be defined that have the functionality of one or more servers and these Cards can be linked together to form clusters of servers in very dense implementations. A high level description of the Card would include a highly integrated SoC implementing the server functionality, DRAM memory, support circuitry such as voltage regulation, clocks etc. . . . The input/output of the card would be power and server to server interconnect and/or server to Ethernet PHY connectivity. SATA connections can also be added to interface to drives. An example of a node card is shown in FIG. 9 with one or more system-on-a-chip (SOC).

The fabric connections on the Card can be designed to balance: usage of SoC PHYs, link redundancy, link bandwidth and flexibility in usage of multiple links at the edge connectors. The system board could house one or more node cards. In the case of housing more than one Card, the system board creates a cluster of Servers that utilize a server to server interconnect or fabric that is integrated in the SoC or a separate function on the card. This system board can be made in many forms, including industry standard form factors such as ATX or in customer form factors. The system board could be a blade or could fit into a standard chassis such as a 2 U or any other size.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A node card comprising:
a power module communicatively coupled to one or more nodes; and
an interface communicatively coupled to the power module and configured to communicate an internal pullup signal from the power module to a chassis management unit, the chassis management unit being communicatively coupled to the interface and configured to detect the presence of the node card, to record the detected presence in a system register, and to receive a command from a master server to enable or disable a non-master server,
wherein the interface is further configured to communicate via node to node links and connect one or more nodes to other nodes on other nodes cards and to provide communication paths between nodes, and
wherein the non-master server requests to be turned off by sending a message to the master server, the master server being one of the nodes of the node card, the non-master server being another of the nodes of the node card.

2. The node card of claim 1, further comprising a system controller that has a digital link to one of the master server or the non-master server.

3. The node card of claim 2, wherein the server is configured to control and communicate with the system controller.

4. The node card of claim 2, wherein the digital link to the system controller is a shared digital link.

5. The node card of claim 1, wherein the chassis management unit receives a disable command from the master server to disable the non-master server.

6. The node card of claim 1, wherein the master server is configured to obtain temperature information from a chassis controller.

7. An apparatus comprising:
a power module that receives power from a set of power signals;
an interface that connects to at least one of one or more connectors and communicates using a set of communication signals, wherein the interface communicates via node to node links, wherein the node to node links connect one or more nodes to other nodes on other node cards and to provide communication paths between the nodes; and
a chassis management unit that receives a command from a master server to enable or disable a non-master server, wherein the non-master server requests to be turned off by sending a message to the master server, the master server being one of the nodes of a node card, the non-master server being another of the nodes of a node card, wherein the interface communicates an internal pullup from the power module to the chassis management unit and the chassis management unit records the presence of the node card in a system register.

8. The apparatus of claim 7, further comprising a system controller that has a digital link to one of the master server or the non-master server.

9. The apparatus of claim 8, wherein the digital link to the system controller is a shared digital link.

10. The apparatus of claim 7, wherein the chassis management unit receives a disable command from the master server to disable the non-master server.

11. A node card comprising:
one or more nodes;
a power module that receives power from a set of power signals;
an interface that connects to at least one of one or more connectors and communicates using a set of communication signals, wherein the interface is configured to communicate via node to node links and connect the one or more nodes to other nodes on other node cards and to provide communication paths between the nodes; and
a chassis management unit that receives a command from a master server to enable or disable a non-master server, wherein the non-master server requests to be turned off by sending a message to the master server, the master server being one of the nodes of the node card, the non-master server being another of the nodes of the node card;
wherein the interface communicates an internal signal from the power module to the chassis management unit and the chassis management unit records the presence of the node card in a system register, the interface is communicatively coupled to the power module and configured to communicate an internal pull up signal from the power module to the chassis management unit.

12. The node card of claim 11, further comprising a system controller that has a digital link to at least one server.

13. The node card of claim 11, wherein the system controller is linked to two or more servers, and wherein the digital links comprise one of multiple independent links and a shared digital link.

14. The node card of claim 13, wherein the shared digital link is a system management bus (SMBus) interface.

15. The node card of claim 11, wherein the chassis management unit is one of a field programmable gate array, cold logic, programmable logic, and a processor with a memory and general purpose input/output (GPIO) pins.

* * * * *